United States Patent
Malzahn et al.

(10) Patent No.: US 8,205,097 B2
(45) Date of Patent: Jun. 19, 2012

(54) MICROPROCESSOR IN A SECURITY-SENSITIVE SYSTEM

(75) Inventors: Ralf Malzahn, Seevetal (DE); Li Tao, Hamburg (DE)

(73) Assignee: NXP B.V., Eindhoven (NL)

( * ) Notice: Subject to any disclaimer, the term of this patent is extended or adjusted under 35 U.S.C. 154(b) by 306 days.

(21) Appl. No.: 12/666,910

(22) PCT Filed: May 9, 2008

(86) PCT No.: PCT/IB2008/051849
§ 371 (c)(1), (2), (4) Date: Dec. 28, 2009

(87) PCT Pub. No.: WO2009/004505
PCT Pub. Date: Jan. 8, 2009

(65) Prior Publication Data
US 2010/0191980 A1 Jul. 29, 2010

(30) Foreign Application Priority Data
Jul. 5, 2007 (EP) .................... 07111867

(51) Int. Cl.
G06F 11/30 (2006.01)
G06F 12/14 (2006.01)
G06F 15/76 (2006.01)
G06F 3/00 (2006.01)
G06F 7/00 (2006.01)
G06F 15/00 (2006.01)

(52) U.S. Cl. .......... 713/189; 712/34; 708/135; 708/200; 708/530

(58) Field of Classification Search .......... 712/34, 712/36; 713/164, 189–194; 708/135, 200, 708/530–534
See application file for complete search history.

(56) References Cited

U.S. PATENT DOCUMENTS

| | | | |
|---|---|---|---|
| 4,183,085 A * | 1/1980 | Roberts et al. | 705/76 |
| 5,458,404 A | 10/1995 | Fennel et al. | |
| 6,028,939 A * | 2/2000 | Yin | 713/189 |
| 6,738,478 B1 * | 5/2004 | Vanstone et al. | 380/28 |
| 6,832,316 B1 * | 12/2004 | Sibert | 713/181 |
| 6,978,372 B1 * | 12/2005 | Jakobsson | 713/180 |
| 6,996,712 B1 * | 2/2006 | Perlman et al. | 713/161 |
| 7,168,065 B1 * | 1/2007 | Naccache et al. | 717/127 |
| 7,404,089 B1 * | 7/2008 | Campagna et al. | 713/194 |
| 7,502,943 B2 * | 3/2009 | Henry et al. | 713/190 |
| 7,624,442 B2 * | 11/2009 | Dellow et al. | 726/22 |
| 7,707,638 B2 * | 4/2010 | Dellow | 726/26 |
| 7,742,595 B2 * | 6/2010 | Joye et al. | 380/28 |
| 7,940,928 B2 * | 5/2011 | Sibert | 380/28 |
| 7,954,153 B2 * | 5/2011 | Bancel et al. | 726/22 |
| 8,065,531 B2 * | 11/2011 | Tobergte | 713/187 |
| 8,135,958 B2 * | 3/2012 | Greco et al. | 713/189 |
| 2003/0128842 A1 * | 7/2003 | Nakano et al. | 380/30 |
| 2003/0182570 A1 * | 9/2003 | Dellow | 713/194 |
| 2004/0230813 A1 * | 11/2004 | Check et al. | 713/189 |
| 2005/0028004 A1 * | 2/2005 | Dellow et al. | 713/200 |
| 2005/0060560 A1 * | 3/2005 | Sibert | 713/193 |
| 2005/0108555 A1 * | 5/2005 | Sibert | 713/187 |
| 2006/0259673 A1 * | 11/2006 | Bancel et al. | 710/110 |
| 2007/0005992 A1 * | 1/2007 | Schluessler et al. | 713/193 |
| 2009/0180610 A1 * | 7/2009 | Tobergte | 380/28 |

* cited by examiner

FOREIGN PATENT DOCUMENTS

| | | |
|---|---|---|
| DE | 19631309 A1 | 2/1998 |
| EP | 1465038 A1 | 10/2004 |
| WO | WO 2007/113697 A2 * | 10/2007 |

*Primary Examiner* — Christian LaForgia

(57) ABSTRACT

A Microprocessor (1) in a security-sensitive computing system for processing an operand according to an instruction is for improving its security provided with a modulo-based check hardware (2) to perform operations in parallel to the microprocessor (1) and for comparing both results regarding congruence.

13 Claims, 1 Drawing Sheet

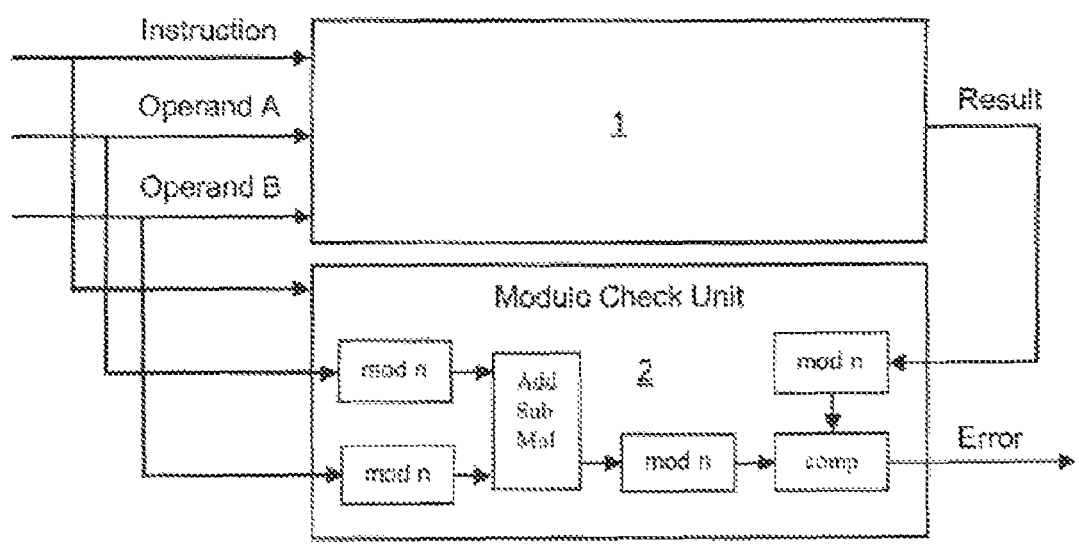

MICROPROCESSOR IN A SECURITY-SENSITIVE SYSTEM

FIELD OF THE INVENTION

The Invention relates to a microprocessor in a security-sensitive system for processing an operand according to an instruction.

BACKGROUND OF THE INVENTION

Modular arithmetic is a powerful tool in many different disciplines such as cryptography and computer science. With modular arithmetic it is possible to code and decode messages or the like with the aid of microprocessors performing certain steps of multiplication, addition, division and/or subtraction according to certain instructions.

Hereby two integers a and a' are called congruent modulo n whereas n is a positive integer if a−a' is an integer multiple of n and it is expressed as a≡a' (mod n).

If a≡a' (mod n) and b≡b' (mod n) then for the integers a, a', b and b' the following rules apply:
(a+b)≡(a'+b') (mod n)
(a−b)≡(a'−b') (mod n)
(a*b)≡(a'*b') (mod n).

Especially in security-sensitive computing systems for example in smart card controllers the arithmetic operations performed by a microprocessor may be disturbed or even manipulated by an attack of an unauthorised person called hacker. This can be dangerous since sensitive data might be stolen particularly if cryptography algorithms like RSA are computed by software.

To overcome this problem two well known solutions are common. In a first solution the microprocessor computation hardware is doubled. But this mostly costs too much chip area. In a second solution a double calculation is performed but thereby the system performance is reduced.

OBJECT AND SUMMARY OF THE INVENTION

Accordingly the invention is directed to a microprocessor which is able to perform security-sensitive calculations and which is protected against an attack without a substantial reduction of its performance.

To achieve this object the microprocessor is provided with a modulo-based check hardware to perform operations in parallel to the microprocessor and for comparing both results regarding congruence.

The core of the invention lies in the fact that a common microprocessor is additionally equipped with a modulo-based check hardware to enhance the system security. The redundant hardware can perform addition, subtraction, multiplication, MAD (Multiply and Addition) and MSUB (Multiply and Subtraction) operations in parallel with the main computation unit or microprocessor and compare both results regarding congruence. In case of a mismatch an attack will be reported to the system.

Since the width of operand vectors is reduced after modulo operation the computation logic in the check unit will be less complex compared with that of the main computation unit. Therefore the modulo-based check represents a cost-effective solution which also does not need a big chip area.

It is clear that precise hardware architecture of the microprocessor and the check hardware can be chosen by a person skilled in the art dependent on the requirements and the amount of data to be computed.

To affect the original computation functionality as little as possible it is recommended to build the check unit outside the main computation unit in the same hierarchy. Both units share all relevant input signals including instruction and both operands.

Additionally the check unit takes the result output of the computation unit as an input.

If a mismatch in congruence has been detected by the check hardware an attack will be reported to the system. That means that an arbitrary error message is displayed and for example a software exception and/or a system reset is performed.

Special attention must be given to the overflow scenarios of the main computation unit. In this case the results of both units will typically mismatch. If an overflow status signal from the computation unit is available it can be used by the check unit to suppress the modulo error status otherwise the modulo check must be disabled for the software code sections that causes the overflow.

BRIEF DESCRIPTION OF THE DRAWINGS

An embodiment of the invention is described below. The drawing shows:

FIG. 1: a schematic microprocessor with a check-hardware.

DESCRIPTION OF EMBODIMENTS

FIG. 1 depicts the general hardware architecture of modulo-based check for addition, subtraction and multiplication operations inside a microprocessor 1 of which detailed implementation can vary for different microprocessor types. To affect the original computation functionality as little as possible it is recommended to build the check unit 2 outside the main computation unit or microprocessor 1 in the same hierarchy. Both units 1, 2 share all relevant input signals including instruction and both operands A, B. Additionally the check unit 2 takes the result output of the computation unit as an input as illustrated with the arrows.

Each time when an instruction is received by the microprocessor 1 the check unit 2 will firstly determine whether it shall be modulo-based checked. If it is the case the both operands A; B will be moduloed whereas a real division operation normally is replaced by other simpler ones and afterwards they are added, subtracted or multiplied according to the instruction type. Finally the result will be moduloed again if necessary. After the result of the microprocessor 1 becomes available, it will be also moduloed and compared with the one of the check unit 2. If the number of cycles that the microprocessor 1 takes for a certain instruction is fixed, the check unit 2 only has to wait for the same number of cycles. Otherwise a status signal of the microprocessor 1 indicating operation completion can be used by the check unit 2. In case the results mismatch the check unit 2 will assert an error status output to signal the attack.

Some microprocessors 2 support the more complex instructions MAD and MSUB. Before checking them the content of the computation unit result register will be firstly moduloed and buffered. After the multiplication of the moduloed operands A, B is finished the buffered value will be added to or subtracted from the multiplication result to get the final reference moduloed result.

For the modulus n the error detection is equal to (n−1)/n. The larger the modulus, the bigger the error detection will be but also the complexity of the check hardware 2. Therefore an appropriate trade-off must be chosen by a designer.

LIST OF REFERENCES 1 microprocessor
2 check hardware
A, B operands

The invention claimed is:

1. A security-sensitive computing system, comprising:
a microprocessor configured to process at least one operand according to an instruction and output a microprocessor result; and
a modulo-based check hardware configured to perform operations in parallel to the microprocessor, wherein the check hardware is configured to:
perform at least one modulo operation on the at least one operand to generate a first modulo result,
perform at least one computation on the first modulo result based on the instruction to generate a first computation result,
perform at least one modulo operation on the first computation result to generate a second modulo result,
perform at least one modulo operation on the microprocessor result to generate a microprocessor modulo result, and
compare the second modulo result and the microprocessor modulo result to determine if they are congruent.

2. The computing system according to claim 1, wherein the check hardware is built separately from the microprocessor in the same hierarchy.

3. The computing system according to claim 1, wherein an error message is displayed if the second modulo result and the microprocessor modulo result are not congruent.

4. The computing system according to claim 1, wherein the check hardware is configured to consider an overflow status signal.

5. The computing system according to claim 1, wherein the at least one computation performed by the check hardware is at least one of addition, subtraction, multiplication, multiply and addition (MAD), and multiply and subtraction (MSUB).

6. The computing system according to claim 1, wherein the check hardware is configured to receive the microprocessor result.

7. A security-sensitive computing system, comprising:
a microprocessor configured to process a first operand and a second operand according to an instruction and output a microprocessor result; and
a modulo-based check hardware configured to perform operations in parallel to the microprocessor, wherein the check hardware is configured to:
perform at least one modulo operation on the first operand to generate a first modulo result,
perform at least one modulo operation on the second operand to generate a second modulo result,
perform at least one computation on the first modulo result and the second modulo result based on the instruction to generate a first computation result,
perform at least one modulo operation on the first computation result to generate a third modulo result,
perform at least one modulo operation on the microprocessor result to generate a microprocessor modulo result, and
compare the third modulo result and the microprocessor modulo result to determine if they are congruent.

8. The computing system according to claim 7, wherein the check hardware is built separately from the microprocessor in the same hierarchy.

9. The computing system according to claim 7, wherein an error message is displayed if the second modulo result and the microprocessor modulo result are not congruent.

10. The computing system according to claim 7, wherein the check hardware is configured to consider an overflow status signal.

11. The computing system according to claim 7, wherein the at least one computation performed by the check hardware is at least one of addition, subtraction, multiplication, multiply and addition (MAD), and multiply and subtraction (MSUB).

12. A method for detecting an error in a security-sensitive computing system, comprising:
processing at least one operand in a microprocessor according to an instruction and outputting a microprocessor result;
generating a first modulo result in a check hardware by performing at least one modulo operation on the at least one operand;
generating first computation result in the check hardware by performing at least one computation on the first modulo result;
generating a second modulo result in the check hardware by performing at least one modulo operation on the first computation result;
generating a microprocessor modulo result in the check hardware by performing at least one modulo operation on the microprocessor result; and
comparing the second modulo result and the microprocessor modulo result in the check hardware to determine if they are congruent, wherein the check hardware operates in parallel to the microprocessor.

13. The method according to claim 12, wherein the at least one computation is at least one of addition, subtraction, multiplication, multiply and addition (MAD), and multiply and subtraction (MSUB).

* * * * *